United States Patent
Robinson

(10) Patent No.: US 8,902,456 B2
(45) Date of Patent: Dec. 2, 2014

(54) SYSTEM TO ENABLE USE OF PDL METADATA TO DRIVE PRINTING OUTCOMES

(75) Inventor: David C. Robinson, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 78 days.

(21) Appl. No.: 13/179,642

(22) Filed: Jul. 11, 2011

(65) Prior Publication Data

US 2013/0016389 A1 Jan. 17, 2013

(51) Int. Cl.
*G06F 3/12* (2006.01)
*G06K 15/02* (2006.01)

(52) U.S. Cl.
CPC .......... *G06K 15/1806* (2013.01); *G06F 3/1206* (2013.01); *G06F 3/1243* (2013.01); *G06F 3/1247* (2013.01); *G06F 3/1285* (2013.01)
USPC ........................... 358/1.15; 358/1.9; 358/1.16

(58) Field of Classification Search
None
See application file for complete search history.

(56) References Cited

U.S. PATENT DOCUMENTS

| 2005/0210227 A1* | 9/2005 | Emerson et al. .................. 713/1 |
| 2008/0231885 A1* | 9/2008 | Truong et al. ................ 358/1.15 |
| 2008/0290987 A1* | 11/2008 | Li ................... 340/5.1 |
| 2010/0238496 A1* | 9/2010 | Oshima ........................ 358/1.15 |
| 2011/0176157 A1* | 7/2011 | Katayama ..................... 358/1.9 |
| 2011/0181910 A1* | 7/2011 | Suzuki ......................... 358/1.15 |
| 2011/0242581 A1* | 10/2011 | Lee ............................. 358/1.15 |

OTHER PUBLICATIONS

Author : Adobe systems incorporated,Title : Adobe PDF Print engine 2: Powering the Next generation of PDF print Workflow , Date: May 2008. No. of pp. 7.*

* cited by examiner

*Primary Examiner* — Kimberly A Williams
*Assistant Examiner* — Richa Mishra
(74) *Attorney, Agent, or Firm* — Fay Sharpe LLP

(57) ABSTRACT

The present disclosure is directed toward method for enabling use of PDL metadata to drive printing outcomes. The method includes receiving a selection for a file in a first format. The method further includes parsing the file for metadata and displaying attributes included in the metadata. The method next assigns each attribute to a print-rendering condition. The method then provides the file in a second format.

13 Claims, 3 Drawing Sheets

SYSTEM TO ENABLE USE OF PDL METADATA TO DRIVE PRINTING OUTCOMES

BACKGROUND

The present disclosure relates to a JDF job ticket for a PDF/VT file and, more particularly, to the creation of the JDF job ticket that includes instructions for print conditions corresponding to variable data.

Portable Document Format ("PDF") is a commonly used standard for representing finished documents after formatting. Generally, a PDF describes the text and graphics of a page at a high level in terms that a raster image processor ("RIP") can interpret. The RIP reads the information and accesses the necessary files for converting the PDF to a raster image for outputting the image electronically on a display or as a printout by an image rendering device. A relatively newer standard is a PDF/VT file, which is a type of PDF file for exchange of variable data and transactional (VT) printing. Generally, the fixed content portions of the PDF function as a template, which is adapted for use in multiple renderings. Each rendering undergoes a merge with variable data for providing printout or display output with variable content. The PDF/VT file can include production information in a Job Definition Format ("JDF"), known as an electronic job ticket, that is provided for rendering the finished document.

A print job ticket is generally created with a PDF document for setting forth particular instructions for processing a print order of that document. A print manager relies on the job ticket to ensure that the desired processing is undergone for producing, for example, a final output provided by selected printing actions, such as, for example, finishing operations. A JDF is an XML-based file format for an electronic job ticket. A JDF file contains job information sent with the print job for ensuring that proper handling takes place. JDF information is embedded in a file and can include, for example, a document creator, text and graphics information, and RIP settings, etc.

Currently, a JDF for a PDF file includes processing instructions that do not vary between print jobs. The print job undergoes the same rendering processes for each instance that the PDF file is used to produce a printout. Similarly, the JDF for the PDF/VT file includes a set of instructions that are used from one print job to the next despite any changes in the variable content.

With the increased use of variable data and transactional printing, different operations become desirable for producing multiple printouts that each can include different variable content. For example, it may be desired that a first PDF/VT document, which includes first variable content, be printed on a first type paper stock, but a second PDF/VT document that includes second variable content be printed on a second type paper stock.

Accordingly, there is a need for an apparatus and a method that does not require a new job ticket be created or modified for each instance a PDF/VT file is used create a document and render the document as a printout. There is a need for a system that creates a JDF job ticket for describing printing operations that each includes different variable contents.

BRIEF DESCRIPTION

A first embodiment of the present disclosure is directed toward a method for enabling use of PDL metadata to drive printing outcomes. The method includes receiving a selection for a file in a first format. The method further includes parsing the file for metadata and displaying attributes and values included in the metadata. The method next assigns each attribute to a print-rendering condition. The method then provides the file in a second format.

A system of rendering print output based on metadata is provided in a second embodiment according to the subject matter of the disclosure. The system includes parsing a file for instructions in metadata and assigning a fixed data extracted from the metadata to a print-condition. The system further includes providing a modified job ticket associating the fixed data with the print-condition. The system also includes providing the modified job ticket to a print rendering device. The system then renders a printout output based on the modified job ticket.

A further embodiment disclosed herein is directed toward a system for providing a file including variable data in a presentation format. The system includes a parser for extracting a metadata attribute from a formatted document. A processor assigns a first value of the metadata attribute to a first process for presenting the file and assigns a second value of the metadata attribute to a second process for presenting the file. A job ticket writer provides a job ticket including instructions for the first and second processes. A decomposer interprets the instructions in the job ticket and the metadata attribute and values in the file. A means for providing a presentation of the file uses at least one of the first and second processes.

DETAILED DESCRIPTION

The present disclosure is directed toward an apparatus and a method that enables a JDF job ticket to be created for tying metadata in a PDF/VT document to select print conditions such that the rendering processes used for producing a printout of the document is based on predetermined variable data.

A job ticket is generally created to accompany a PDF document when the PDF document is generated. The job ticket becomes associated with the PDF file and follows the document during the various stages of a print rendering process. More particularly, the job ticket specifies instructions for rendering a printout of the PDF document. A JDF is an electronic version of the job ticket that includes the instructions for using the PDF/VT metadata. In this manner, the JDF job ticket of a PDF file can be used repeatedly to render multiple copies of the PDF document. A PDF/VT file differs from a conventional PDF file because variable data is merged with fixed content in the PDF for each rendering of a printout. The variable data that is used from print job-to-print job can be different, but the fixed content remains constant for all print jobs. A JDF job ticket can be created for a conventional PDF/VT document. However, the JDF job ticket includes a set of processing instructions that is managed the same for each printout rendering of the print job irrespective of the variable data content.

The subject matter disclosed in the present disclosure relates to a JDF job ticket for a PDF/VT file and, more particularly, to the creation of the JDF job ticket. The disclosure is directed to a method and an apparatus that uses an original JDF job ticket created for the PDF/VT file for building a modified JDF job ticket that includes a set of alternate instructions. The original JDF job ticket includes instructions for using the fixed metadata. The metadata is extracted from the PDF/VT file and then used to build the modified JDF job ticket including alternate instructions based on conditions corresponding to metadata.

Figure 1:
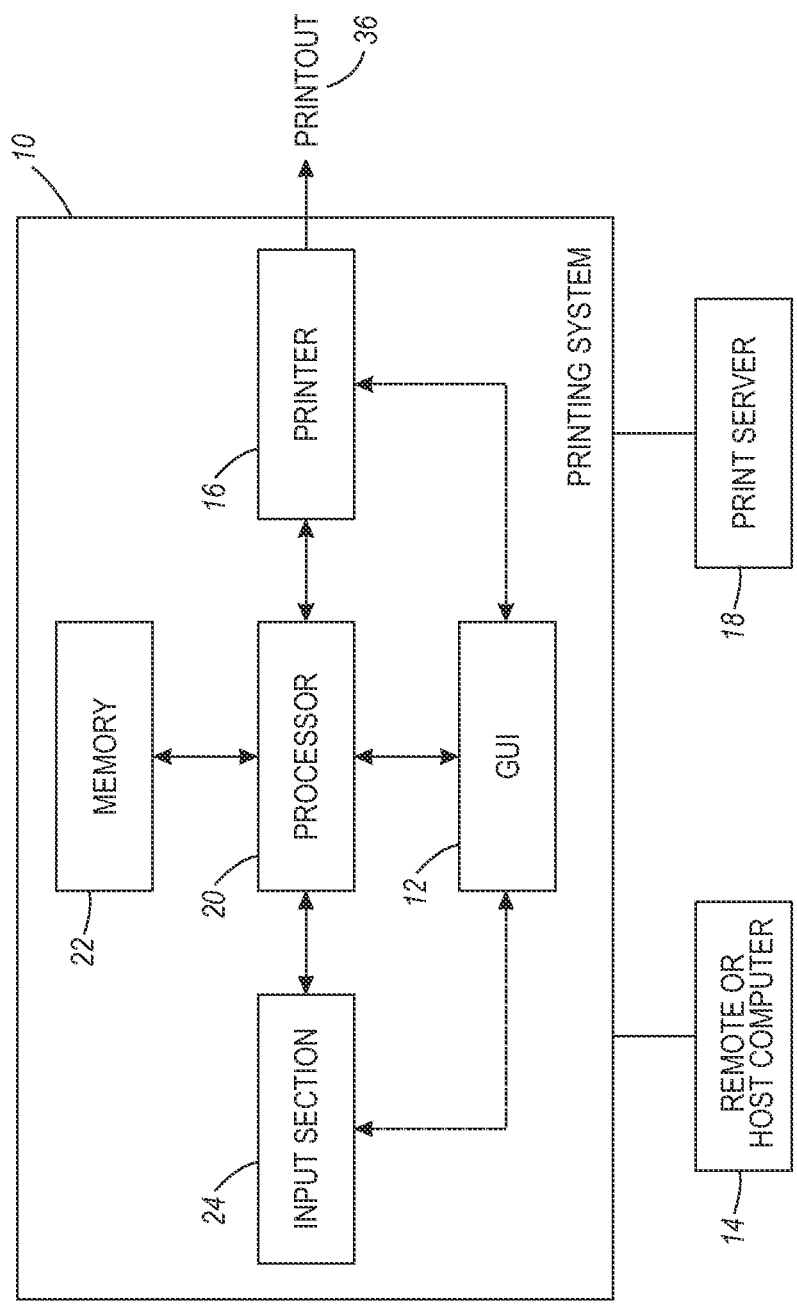
FIG. 1 is a schematic diagram of one embodiment of a system for enabling use of PDL metadata to drive print outcomes.

FIG. 1 is a schematic illustration of one example embodiment of a system for enabling the use of page description language ("PDL") metadata to drive print outcomes. The system 10 provides a user with the capability of creating print condition-specific JDF job tickets based on variable data. Control of the system 10 may be exercised in a network environment either remotely or through a graphic user interface ("GUI") 12 of an individual device, such as a computer 14 or printer device 16. The network may run proprietary remote access software, for example, a DocuSP/FreeFlow Remote workflow (hereinafter referred to as "FFPS"), enabling a user to remotely access a dialog for creating the JDF job ticket. Alternatively, the user can remotely access the JDF job ticket application through the (e.g., remote) computer 14 running publicly available GUI access software. Remote computer 14 as well as the user, may access the GUI 12 of the printing system 10 to enter selections for associating print conditions with metadata extracted from the PDF/VT file associated with the original JDF job ticket. For purposes of modifying and/or building the new JDF job ticket, any remote or computer or printing device capable of communicating with the target system can be used, including a cell phone voice or text message to the device, all of which are contemplated by the scope of the claims herein. All that is necessary to define JDF tickets remotely is a device that is adapted to provide information, such as, for example, using a visual dialog, for the machine to be configured. The JDF creation component may reside on a print server 18 or (e.g., host) computer 14 and provide an alternate means for accessing an original JDF job ticket for a PDF/VT file through the user interface. If the user only has access to a printing system 10 through a print server 18, the print server 18 can provide the user and device interfaces to facilitate operation. In addition, the host computer 14 can provide its own interface for generating the JDF ticket for use with connected devices, such as printing system 10. The JDF ticket can then be transmitted to the printing system by means of the print description language (PDL).

With continued reference to FIG. 1, the system includes a digital processor 20 having a main memory (i.e., a job storage) 22, but is contemplated in some embodiments as further having an additional memory (not shown). The memory 22 stores PDF/VT print job files written in a printer page description language (PDL), wherein the user can select one for producing printouts of selected image components obtained from the PDL. The processor 20 further includes an input section 24 for providing print jobs in the PDL format. Furthermore, the GUI 12 enables the user to interact with the processor 20, the input section 24, and the printer device 16, which can be a multi-function image producing apparatus.

The GUI 12 collectively represents the input devices through which the system receives image editing and manipulation instructions entered or input by the user for the processor 20. Additionally, the GUI 12 represents the output devices through which the user receives feedback with respect to the actions that are taken in response to the instructions that are entered by the user or otherwise, such as under program control. For example, the GUI 12 generally includes a keyboard or the like for entering user instructions, a display monitor for displaying the process that is being performed by the processor 20, and a cursor controller for enabling the user to make selections from and/or enter data into a process that is being displayed by the monitor.

The illustrated system 10 can be centralized, so it has been simplified by assuming that all control instructions and all image editing and manipulation instructions are executed by the processor 20 under program control. In practice, however, the execution of these instructions may be handled by several different processors, some or all of which may have their own memory. Likewise, either or both of the input section 24 and the printer device 16 may have its own interface.

Figure 2:
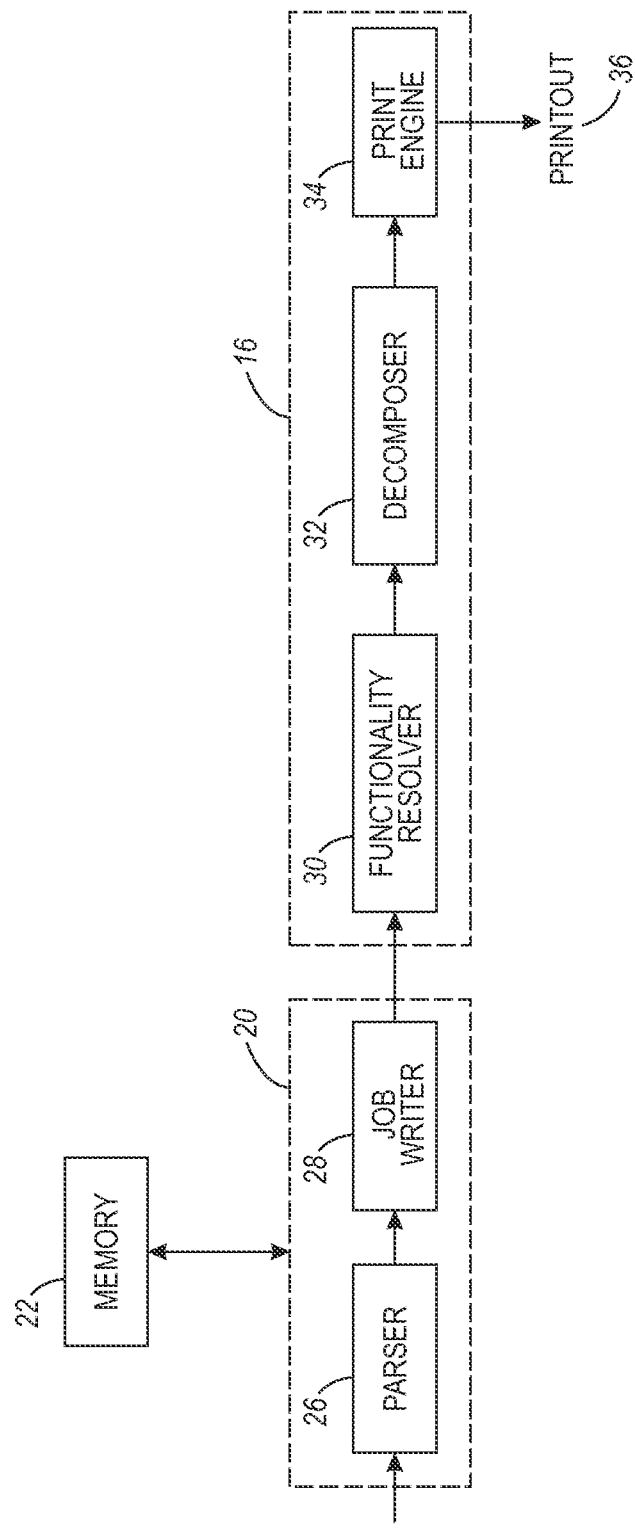
FIG. 2 is a schematic diagram of a processor/printer interface for the system shown in FIG. 1.

Now referring to FIG. 2, the system 10 further includes a parser 26 for parsing the PDF/VT file received from the memory 22, from a disk, or from off of the network. The parser 26 extracts metadata included in the PDF/VT file. This metadata is displayed on the GUI 12 (FIG. 1) where it is selected by the user to modify the original JDF job ticket. A method for generating the modified JDF job ticket is discussed later. Generally, conditional logic is generated for assigning print actions/conditions to the metadata. A JDF writer 28 provides JDF rule-based print commands associated with the metadata to the printer device 16. The processor transfers the PDL description of the selected electronic file to the printer device 16 along with the created JDF job ticket. The print server 18 sends print jobs and the JDF job ticket (i.e., job control information) to the printer device 16 in communication with the server 18. Settings for certain attributes, such as certain printer device attributes (hereinafter referred to as "printer attributes") can flow from the print server 18 (FIG. 1) to the printing system 10. A functionality resolver 30 determines if the print conditions associated with each metadata is compatible with capabilities and functions of the printer device 16. If the print conditions in the JDF job ticket and the functions/capabilities of the printer device 16 are compatible, the PDF/VT file and the JDF job ticket advance to the PDL decomposer 32.

With continued reference to FIG. 2, the decomposer 32 includes a raster image processor ("RIP" that uses the commands and data included in a print data stream to generate the raster data which eventually gets printed. The decomposer 32 receives a fully qualified JDF data stream with all the commands and data needed for the printing system. Generally, the print server 18 passes the data stream to a Gateway within the printing system 10, which then forwards the data stream to the decomposer. The decomposer rasterizes the image and determines the processes for which the system follows, such as medium finishing commands, for producing a printout (or electronic display). As mentioned, the decomposer 32 decomposes the PDL descriptions for producing a corresponding bitmapped image file, which is then used by a print engine 34 for rendering a printout 36.

Figure 3:
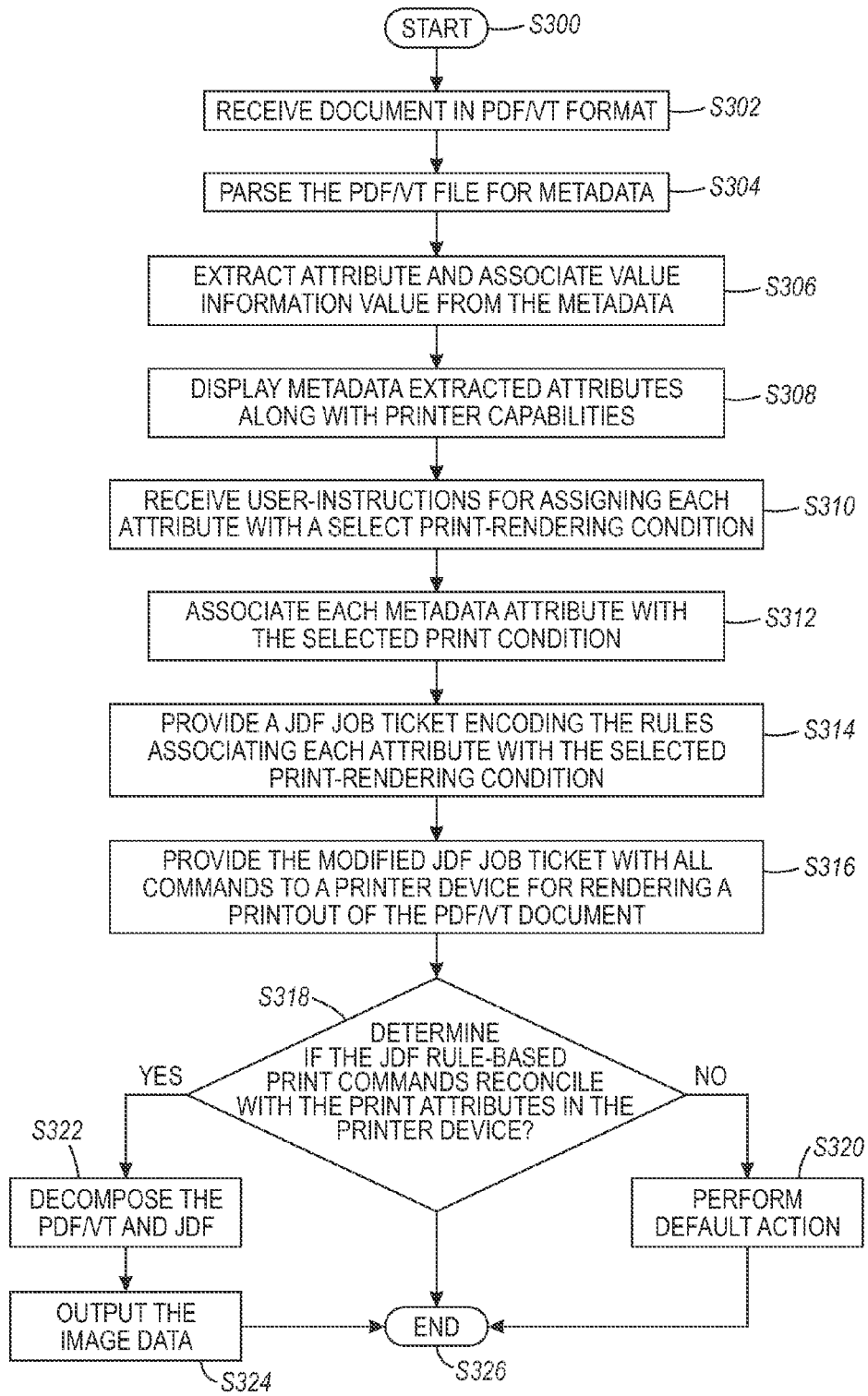
FIG. 3 is a flow chart depicting a method according to an embodiment of the disclosure for using PDL metadata for driving print outcomes.

Now referring to FIG. 3, a method is illustrated for providing a JDF job ticket associating metadata with print conditions for driving print outcomes. Although the control method is illustrated and described below in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 10, wherein the disclosure is not limited to the specific applications and embodiments illustrated and described herein.

Referring to FIG. 3, the method starts at S300. The GUI provides on a digital front end (DFE) an interface for the PDF/VT definer application disclosed herein. The interface displays a list of previously converted PDF/VT files to the user. At least one PDF/VT file is received at S302. In one example embodiment, the PDF/VT file is obtained from a list of at least one PDF/VT file stored in the memory and is based on a selection made by the user. However, other embodiments are contemplated in which the PDF/VT file may be generated by creating a document using an application, and then formatting the document into a PDL using a PDL driver. In another embodiment, the PDF/VT document may be received from a disk or across a network. Generally, a document that has been previously converted to a PDF format is received at S302.

With continued reference to FIG. 3, the selected PDF/VT document includes a previously generated JDF job ticket (hereinafter referred to as an "original JDF job ticket"). The original JDF job ticket describes the specifications and/or attributes of the print job, such as, for example, paper size, print quantity, manual/duplex printing, print stock, and finishing items (i.e., hole-punch, binding, and stapling, etc.). The original JDF job ticket is more specifically defined as a set of electronic instructions that follow the PDF/VT file for automating the printing process. The PDF/VT file includes the variable data information that was merged with the fixed content of the PDF document to form the PDF/VT document. The variable data, hereinafter referred to as "attributes", is defined herein as data that is different for each print record.

With continued reference to FIG. 3, the present system parses the PDF/VT file at S304 to extract the attributes. More specifically, the system parses and records all metadata attribute/value pairs within the PDF/VT file. In the example later discussed, a metadata pair can include a variable data content assignment/value of "female" or "male" for a gender attribute included in the metadata. At least attribute information that relates to the variable data content is extracted from the metadata at S306. In one embodiment, the GUI can display a metadata-value pair one time being representative of multiple occurrences of that metadata value pair in the document.

Continuing with FIG. 3, the system displays the extracted attribute information at S308 on the GUI. In one embodiment, the system can limit the number of attributes presented to the user to only select attributes desired by the user. For example, the system can display user-selected metadata attributes to the user on the GUI while suppressing undesirable metadata attributes from view. For example, in one embodiment, the system can display metadata attributes corresponding to first variable data content while suppressing metadata attributes related to second content, such as, for example, author (of the PDF/VT document) information.

Simultaneously, using the same interface, the system displays printer attributes at S308. The printer attributes are defined as printer(-specific) device capabilities. More particularly, the printer device that is operatively associated with the system is adapted to provide particular processing and/or finishing actions/operations. For example, the printer device may be capable of providing printouts on print media substrates within certain size ranges, or on print media substrates having certain thickness and texture characteristics. For example, the printer device may be suited for rendering onto the print media substrate certain print images having select pile heights based on the number of passes the print engine is capable of handling. The functions of printer devices vary from machine-to-machine. The display presents the attributes of a select printer device on the GUI for the user to view. The GUI can present printer capabilities pulled from a (e.g., FFPS) Device Object Library. Furthermore, the display may limit the number of attributes that it presents to the viewer based on desirable and undesirable characteristics.

Continuing with FIG. 3, the GUI receives inputs at S310 made by the user for assigning the selected metadata attributes with select print-rendering conditions. More specifically, the system receives user instructions related to conditional limitations placed on the metadata attribute based on the extracted values. In other words, the system receives inputs related to directions on how to use the metadata. The GUI can provide the user with drag-and-drop options, pull-down options, spread-sheet options, and any conventional, known option for building conditional logic for print-actions based on the attribute values in the parsed data. The metadata is fixed, but the capabilities of print engines, i.e., the IOT state, can change. Accordingly, the user can provide the JDF with a set of instructions for using the metadata if the attribute value is within a first predetermined threshold range and a set of different instructions for using the metadata if the attribute value is in a second predetermined, different threshold range.

With continued reference to FIG. 3, the system associates each selected conditional limitation of the metadata attribute and value to the corresponding selected print-rendering condition at S312. In this manner, a particular action/process is assigned to the print job for rendering an output of the PDF/VT document if the metadata attribute is within the bounds of the conditional limitation. The selected particular action/process is omitted in the rendering process if the conditional limitation is not met.

The conditional limitation may set forth particular thresholds, ranges, or bounds for which the variable content (for example, values) associated with a select metadata attribute must meet for the print job to undergo the select print condition as a print action/process during the rendering processes. In one example set forth for illustrative purposes only, a metadata attribute may include recipient age information. An example of a conditional limitation that the system can receive from the user-inputs may include a first select process for ages less than a certain number and a second select process for ages greater than or equal to the certain number. The first rendering process can include printing the printout from a first tray and the second rendering process can include printing the printout from a second tray, wherein the print media substrates housed in the respective trays can vary in size, texture, or color. As the example illustrates, the print condition is based on the values for the attribute in the attribute-value pair.

With continued reference to FIG. 3, the system generates a newly built or modified JDF job ticket (hereinafter collectively referred to as "modified JDF job ticket") at S314. The modified JDF job ticket encodes the rules associating at least one metadata attribute with the selected print-rendering condition(s). An XML file is written once the metadata and the print action/condition pair are tied/associated together. The modified JDF job ticket, and therefore the rules regarding production information, is provided with the PDF/VT file for generating a printout of the PDF/VT document. In this manner, one aspect of the present system is that the rules can be edited and/or inserted within the modified JDF job ticket at the time of printing rather than at the time the PDF/VT document is being created. In other words, the rules encoded in the modified JDF job ticket do not need to be generated at the time the variable data content is being merged into the PDF document, but rather can be created at the time an electronic display or printout of the PDF/VT document is being produced. The disclosure allows job rules to be specified at the GUI for the print device so that print jobs without embedded rules can have locally specified rules applied to them.

With continued reference to FIG. 3, the GUI provides the user with an option to save the JDF, to electronically display the document, or to send the PDF/VT file to print with the newly built JDF job ticket. When a print command is issued for rendering an output copy of the PDF/VT document, the modified JDF job ticket is provided with all the rules/commands encoded therein to a printer device for rendering at S316. A functional resolver determines if the print-conditions associated with the attribute metadata are compatible with the functions/capabilities of the print device at S318. In other words, the system solves conditional logic by comparing the variable data content to the condition set in the logic. The resolver extracts the information from the fixed data. The resolver also determines conditions beyond the JDF, such as, for example, a copy count.

With continued reference to FIG. 3, if the comparison of S318 determines that a function/capability of the printer device is not compatible with a process required in the JDF job ticket for rendering the printout, then the system can perform a default action at S320. The system can reconcile the JDF with (e.g., FFPS) print attributes from the (e.g., FFPS) printer device queue settings. In a different example discussed herein for illustrative purposes only, a metadata can include a series of states, such as, for example, Vermont, Ohio, etc. The printer device capability that is presented to the user on the GUI can include the color "green" as the machine media color that is available. The metadata is fixed, but the printer device settings change, such as, for example, when the printer device tray houses only "orange" paper. In a different contemplated embodiment when the commands within the modified JDF job ticket and the GUI functionalities disagree, the system can make a choice. This default choice can include modified JDF commands succeeding over the GUI functionalities. The modified JDF job ticket overrides the GUI to resolve the incompatability. For example, the system can change the directions on how to use the metadata.

With continued reference to FIG. 3, if the comparison of S318 determines compatibility, then the PDF/VT is rasterized at S322. In this manner, the RIP reads the PDF commands and converts the commands to pixel values that the image output terminal (IOT) can interpret. The decomposer reads both the PDF/VT and JDF to determine the necessary processes for producing the printout. If the decomposer determines that the JDF job ticket refers to metadata that is not included in the current version of the PDF/VT file, then the system defaults such that at least the one process corresponding to the associated print condition is omitted in the set of processes. In other words, the JDF job ticket continues to the next instruction if no corresponding metadata was extracted from the PDF/VT.

With continued reference to FIG. 3, the print engine outputs a printout at S324. To provide the printout, the print engine follows the processes set forth in the modified JDF job ticket. As mentioned, the conditions set forth in the JDF job ticket can instruct the print engine, in one example, to use a particular tray for pulling the print media substrate. The conditions may further set forth, for example, the toner applying components that are used, such as monochrome or colored CMYK toners for rendering variable data between select values. The foregoing examples are set forth herein for illustrative purposes only and should not be considered limiting to the type of print rendering conditions selected at S310.

With continued reference to FIG. 3, another embodiment is contemplated where the output image is not a physical printout rendered on a print media substrate, but is rather included in another presentation format, like a screen. The JDF can be used for providing the user with an electronic PDF for viewing the digital image electronically on a display of the GUI at S326. For example, the conditions and/or rules encoded in the JDF modified job ticket can control graphics and pixels for image and/or background colors electronically presented on a display based on whether the condition encoded in the modified JDF ticket is met. The method ends at S328.

One aspect of the present disclosure is that the same PDL document can be used multiple times despite changes in the capabilities of the print device. The outcome changes from print job-to-print job. However, print jobs can mix and match at will without forming and sending a new JDF job ticket for each one.

EXAMPLE

An example of a JDF job ticket according to the present disclosure that includes a conditional instruction for a variable data corresponding to age and gender and, more specifically, for associating a color of print media based on the determined age and gender. The example JDF job ticket may be created using the following exemplary PostScript pseudo-code:

```
<?xml version="1.0" encoding="UTF-8"?>
<JDF ID="j0" JobPartID="jp0" Status="Waiting" Type="Combined"
Types="Rendering Interpreting LayoutPreparation Screening
DigitalPrinting" JobID="Inventor" Version="1.4"
xmlns="http://www.CIP4.org/JDFSchema_1_4" xmlns:xsi=
"http://www.w3.org/2001/XMLSchema-instance" xsi:schemaLocation=
http://www.CIP4.org/JDFSchema_1_4>
    <ResourceLinkPool>
        <Media ID = "pink" Brand="Xerox" Dimension = "500 600"
MediaType= "paper" Weight = "80" MediaColorName = "Pink" />
        <Media ID = "blue" Brand="Xerox" Dimension = "500 600"
MediaType= "paper" Weight = "80" MediaColorName = "Blue" />
        <Media ID = "white" Brand="Xerox" Dimension = "500 600"
MediaType= "paper" Weight = "80" MediaColorName = "White" />
<If>
    <Conditional>
        <And>
        <MetadataMap "Gender" = "Female" "Age" < 3 />
            <And/>
            <True>
                <Media = "pink" />
            <True/>
            <And>
<MetadataMap "Gender" = "Male" "Age" < 3 />
            <And/>
            <True>
                <Media = "blue" />
            <True/>
            <And>
<MetadataMap "Age" ≥ 3 />
            <And/>
            <True>
                <Media = "white" />
            <True/>
            <And>
        <Conditional />
<If/>
</JDF>
```

In the example, the PDF/VT metadata contains recipient age and gender information. The variable data for age and gender included in the PDF/VT file is extracted, and the attributes for age and for gender are displayed on the GUI for the user. In the example, the user builds the following rules: if the gender is female and her age is less than three years old, then the printout is printed on pink paper; if the gender is male and he is less than three years old, then the printout is printed on blue paper; else wise, the printout is printed on white paper.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for enabling use of PDL metadata to drive printing outcomes, the method comprising:
   receiving at a graphic user interface a selection for a previously created file in a Portable Document Format file for exchange of variable and transactional printing ("PDF/VT") including a previously generated JDF job ticket;
   extracting variable information merged in the document;
   displaying fixed attribute contained in metadata on a graphic user interface, each fixed attribute relating to the variable information merged in the document;
   simultaneously displaying on the graphic user interface printer attributes of a printer rendering device that is operatively associated with the system and is adapted to provide particular print-rendering operations;
   after the displaying and in response to receiving directional inputs from a user, assigning a set of print operations to at least one attribute, each print operation being based on a value associated with the at least one fixed attribute;
   generating by the processor a modified job ticket for interpreting the attributes and values extracted from the file;
   comparing at least one value included in the extract variable information to the print condition encoded in the modified job ticket for the fixed attribute relating to the at least one value;
   in response to a capability of the printer rendering device not being compatible with the print condition required in the modified job ticket for rendering a printout of the document, reconciling the modified job ticket with a printer device attributes from printer device queue settings.

2. A method according to claim 1 further comprising:
   in response to remaining attributes not assigned a print condition as part of the directional inputs, suppressing the remaining attributes from the displaying.

3. A method according to claim 1 further comprising providing the file and the modified job ticket to a print rendering device.

4. A method according to claim 3 further comprising comparing the directional inputs with capabilities of the print rendering device.

5. A method according to claim 4 further comprising determining if the print attributes of the print rendering device are compatible with the set of print conditions assigned to the at least one fixed attribute of the metadata.

6. A method according to claim 5 further comprising providing a predetermined override condition if the print attributes of the print rendering device are determined as not being compatible with the set of print-rendering conditions assigned in the modified job ticket.

7. A method according to claim 1 further comprising solving conditional logic by extracting information in fixed data included in the metadata and comparing the fixed data to a condition set in logic.

8. A method according to claim 5 further comprising decomposing the modified job ticket and file.

9. A method according to claim 6 further comprising:
   determining if a value is included in the variable information in the document for a fixed attribute associated with a print rendering condition in the job ticket; and,
   continuing to a next instruction if no value is extracted from the document.

10. A non-transitory computer readable medium adapted for performing the method of claim 1.

11. A method according to claim 1 further comprising:
    for the at least one fixed attribute, assigning a first print-condition for the value being under a threshold and a second print-condition for the value meeting or exceeding the threshold.

12. A system for providing a file including variable data in a presentation format, the system comprising:
    a parser operative to:
       extract variable information merged in a Portable Document Format file for exchange of variable and transactional printing ("PDF/VT") including a previously generated JDF job ticket, and
       extract at least one fixed attribute contained in metadata of the file;
    a display for displaying a fixed attribute contained in the metadata attribute and being related to the variable information contained in the document, the display simultaneously displaying printer attributes of a select printer rendering device that is operatively associated with the system and is adapted to provide particular processing operations;
    a processor operative to, in response to receiving directional inputs from a user, assign a set of print operations to the at least one fixed attribute, each print operation being based on a value associated with the at least one fixed attribute;
    a job ticket writer for generating a modified job ticket including instructions for interpreting the variable information extracted from the file;
    a decomposer for interpreting the instructions;
    a functional resolver operative for:
       compare at least one value included in the extracted variable information to the print condition encoded in the modified job ticket for the at least one fixed attribute relating to the at least one value, and
       in response to a capability of the printer device not being compatible with the print condition required in the modified job ticket for rendering a printout of the PDF/VT file, reconciling the modified job ticket with a print attribute from the printer device queue settings; and,
    a means for providing a presentation of the file using at least one of the first and second processes.

13. A system according to claim 12 further including a graphic user interface for presenting a user with the fixed attribute and being further adapted to receive user-inputs made for associating one of the first and second values with a select one of the first and second processes.

* * * * *